United States Patent
Christofferson et al.

(10) Patent No.: US 6,915,302 B1
(45) Date of Patent: Jul. 5, 2005

(54) METHOD, SYSTEM, AND PROGRAM FOR ACCESSING FILES IN A FILE SYSTEM

(75) Inventors: Armin Harold Christofferson, Rochester, MN (US); Leon Edward Gregg, Rochester, MN (US); James Lawrence Tilbury, Rochester, MN (US); James Michael Van Oosbree, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,613

(22) Filed: Oct. 1, 1999

(51) Int. Cl.[7] .............................................. G06F 7/00
(52) U.S. Cl. ........................ 707/102; 707/1; 707/100; 707/101; 707/200
(58) Field of Search ........................ 707/1, 100, 101, 707/102, 200; 700/100–102; 341/51

(56) References Cited

U.S. PATENT DOCUMENTS

| | | | | |
|---|---|---|---|---|
| 5,765,165 A | * | 6/1998 | Harper | 707/104 |
| 5,893,120 A | * | 4/1999 | Nemes | 707/206 |
| 5,987,477 A | * | 11/1999 | Schmuck et al. | 707/201 |
| 5,990,810 A | * | 11/1999 | Williams | 341/51 |
| 6,449,695 B1 | * | 9/2002 | Bereznyi et al. | 711/134 |
| 6,535,867 B1 | * | 3/2003 | Waters | 707/1 |

OTHER PUBLICATIONS

Michael Main, Walter Savitch, Data Structure and other Objects Using C++, Copyright 1997 by Addison Wesley Longman, p. 546, 547.*

Thomash H. Cormen, Charles E. Leiserson, Ronald L. Rivest, Introduction to Algorithms, Copyright 1990 by The Massachusets Institute of Technology. p. 222.*

* cited by examiner

*Primary Examiner*—Shahid Alam
*Assistant Examiner*—Hung Pham
(74) *Attorney, Agent, or Firm*—Konrad, Raynes & Victor, LLP

(57) ABSTRACT

Disclosed is a system, method, and program for processing an input file in a file system, wherein the input file has an input file name. A function is applied to map the input file name to a value. A data structure is processed to determine whether there is a preexisting file in the file system having a name that maps, according to the function, to the same value to which the input file name maps. Two files that map to a same value according to the function are capable of having a same name.

39 Claims, 2 Drawing Sheets

METHOD, SYSTEM, AND PROGRAM FOR ACCESSING FILES IN A FILE SYSTEM

BACKGROUND OF THE INVENTION

1. Field of the Invention

The present invention relates to a method, system, and program for accessing a file in a file system by processing a data structure indicating the presence of preexisting files having the same name as a file to access.

2. Description of the Related Art

In data storage systems, before a file is stored, the file system is searched to determine if there is already a file having the name of the file to store. The file system includes the logical structures and software routines used to control access to files stored on a non-volatile storage medium, such as a hard disk drive, tape, optical disk, etc. In a file system, the files are stored in directories which provide a hierarchical arrangement of data. Each file or directory on the media can be uniquely identified using two pieces of information: its filename and the path in the directory that is traversed to access the file. The are various file systems in use (FAT, Unix, and ISO9660 and UDF for CDROMs and DVD devices).

Each file representation exists in a directory structure specific to its file system. To add a file to the file system, the directory must be searched to determine if the file already exists on the media. These directory access operations can have a significant impact on performance because storage media such as hard disk drives, tape, and optical disks are relatively slow devices due to the need to mechanically move the read head to different locations in the storage medium. In fact, such disk read operations can consume significant time.

One current solution to this problem is to maintain a list or database table of all file names in the file system. In this way, when a file write request is received, the list can be checked to determine if the file to store or update is already in the file system. Such an approach avoids the burdensome operation of expending time doing I/O operations to search the file system. One problem with this approach is that the data structure to store the file names can be particularly large, especially with file systems that support long file names, e.g., 256 characters long, and increasing. As the storage capacity increases and the file name length increases, the usefulness of this technique decreases because the table needed to store the name of each file may increase to a point where it is no longer feasible to maintain in cache. In such case, the table would have to be stored on the non-volatile storage medium, and have to be accessed using the slower performing disk drive actuator and head.

Thus, there is a need in the art for an improved, method, system, and program for determining the current files in the file system.

SUMMARY OF THE PREFERRED EMBODIMENTS

If the majority of file access operations update existing files, then the directory search cannot be avoided. However, in an application where the primary file access is to add new files (data archive), the search is primarily to validate that the file does not already exist. Data archival also tends to produce new files at a very high rate. This causes archival systems to suffer major performance degradation as the number of files in the directory increases.

To overcome the limitations in the prior art described above, preferred embodiments disclose a method, system, and program for processing an input file in a file system, wherein the input file has an input file name. A function is applied to map the input file name to a value. A data structure is processed to determine whether there is a preexisting file in the file system having a name that maps, according to the function, to the same value to which the input file name maps. Two files that map to a same value according to the function are capable of having a same name.

In further embodiments, the function is a hash function that maps the input file name to an integer value. In such case, the data structure includes an entry for each possible integer value capable of being generated from the hash function.

In yet further embodiments, the data structure is processed to determine whether there is a preexisting file by determining whether the entry for the integer value to which the input file name maps indicates the presence of one preexisting file mapping to the same integer value as the input file name.

In still further embodiments, the data structure is a one-dimensional array. Each entry is capable of having one of two values and the entry is set to a first value if there is one preexisting file name in the file system that maps to the integer value for the entry. In such case, determining whether there is one preexisting file comprises determining whether the input file name maps to one entry that has the first value.

Preferred embodiments provide a method, system, and program for determining from a data structure a possible presence of a preexisting file in the file system having the same name as an input file. Preferred embodiments utilize a function, such as a hash function, to map file names to values that can be represented using substantially less space than the file name. The data structure maintains information on values to which preexisting files map. In this way, upon receiving a write operation or other file request, a determination can be made from processing the data structure, such as the hash table in cache, as to whether there is a preexisting file that maps to the same value as the input file. This may indicate that the preexisting file has the same name as the input file.

After determining that the input file maps to a value to which one preexisting file maps, the file system can be scanned to determine if there is a file with the same name as the input file. If not, then a file can be added for the input file. Otherwise, if there is already a file with the same name, then writing the input file would comprise updating the preexisting file with the same name with the content of the writes. Preferred embodiments provide a system to process file operations, such as a write operations, by first checking the table which would definitely indicate if there was no file having the same name. This allows the operating system to avoid, in most cases, having to search the entire file system each time data is written to the file system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Problems with Current Archival Storage Systems

Current archival storage systems back-up files in a mass storage device, such as magnetic tape cassettes, optical disks, etc. It has been found that most of the write operations to files in an archival storage system comprise writing new files as opposed to updating existing files. Files are often written once to archival storage and never subsequently accessed to read or update. However, for each new write operation, the operating system must scan the entire file system to determine whether the file that is the subject of the write operation is a new file or existing file. If the file being written already exists, then the operating system updates the existing file with the write data. Otherwise, if the file to write does not currently exist in the file system, then the operating system creates a new file in the file system to archive the write data.

Although it is likely in archival storage systems that a write operation is going to create a new file, the operating system nonetheless performs the time consuming operation of scanning the entire file system, which may require reading directory information from fragmented storage locations. The operating system must determine whether a same named file exists in the system to avoid a situation where there are two files with the exact same name. The time needed to scan increasingly large file systems can significantly affect the performance of write operations. For this reason, there is a need in the art for an improved system for determining whether a file already exists in the file system. Such an improved system would be particularly useful for archival storage systems where most write operations are to new files and, thus, do not require a search of the file system for a matching file name.

Computing Environment

Figure 1:
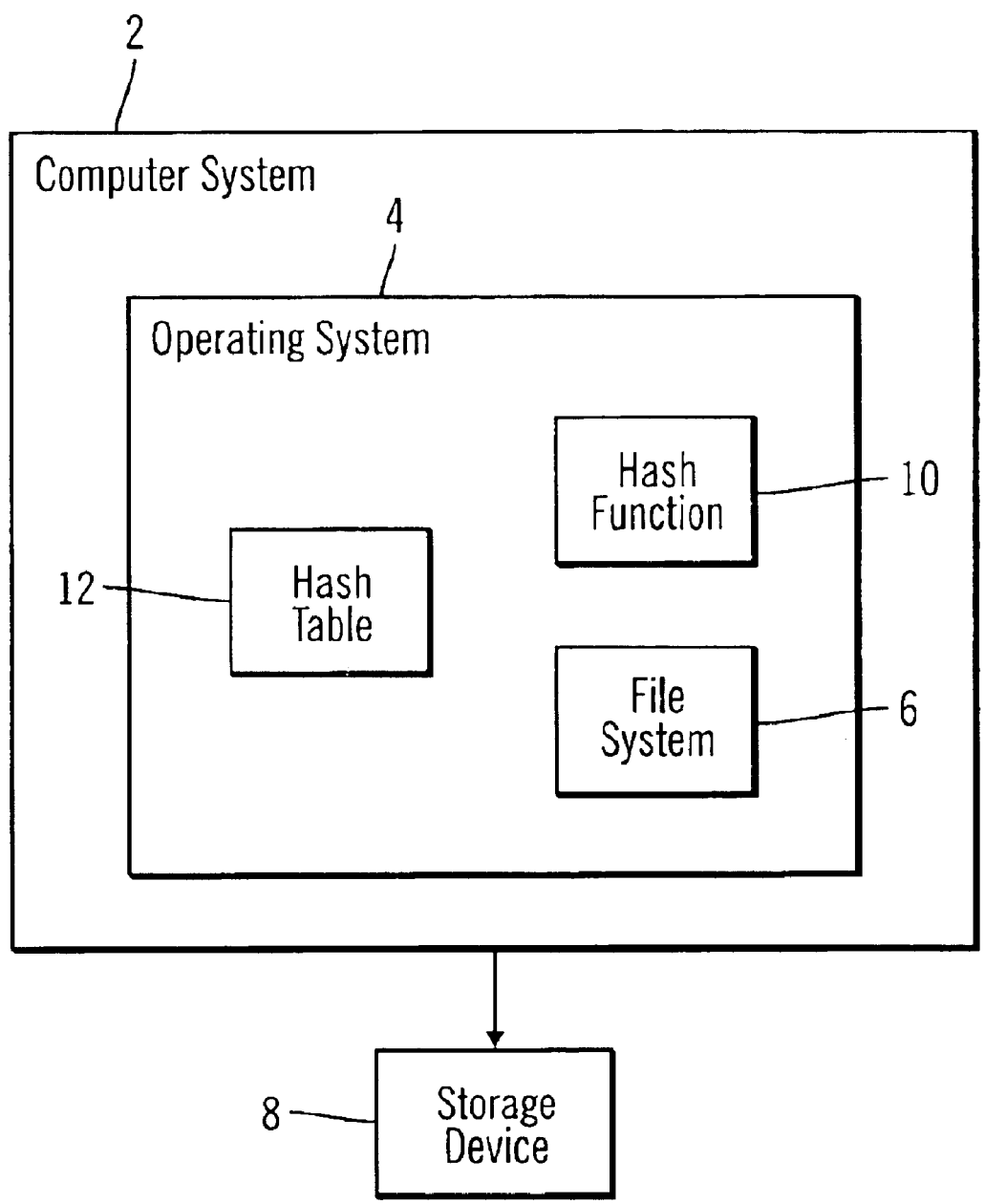
FIG. 1 is a block diagram illustrating a computing environment in which preferred embodiments of the present invention are implemented.

FIG. 1 illustrates a computing environment in which preferred embodiments are implemented. Computer system 2 may comprise any computing system known in the art, e.g., workstation, personal computer, mainframe, palmtop, laptop, server, etc. The computer system 2 includes an operating system 4, such as MICROSOFT WINDOWS, AIX, OS/390, OS/2, MVS, UNIX, LINUX** etc. The computer system 2 further includes a file system 6. The computer system 2 is capable of accessing a storage device 8, which may comprise any type of non-volatile storage device known in the art, e.g., hard disk drive, tape drive, optical disk system, holographic storage units, etc. The file system 6 would define the location of parts of files maintained in the storage device. The file system 6 would provide a mapping of logical file names to physical locations in the storage device 8. The storage device 8 may comprise a single storage device or a multitude of storage devices at distributed locations in a network. In such distributed storage environments, the file system 6 would define the location of files in distributed storage throughout a network.

**Microsoft, Windows, and Windows NT are registered trademarks of Microsoft Corporation; AIX, OS/390, and OS/2 are registered trademarks and MVS is a trademark of IBM; Unix is a registered trademark of The Open Group; and LINUX is a trademark of Linus Torvalds.

A file system is a logical method for organizing and storing information. The file is the smallest unit in which information is stored. A hierarchical arrangement of directories with respect to a root directory, which is the root node of the hierarchical file structure, defines the logical address of files in the system. For instance, in UNIX file systems, the root directory is represented by the forward slash character "/". Every file and directory in the file system may be identified by a complete list of the names of the directories to that file or directory, which is referred to as the pathname of the file. The pathname includes all directories under which the file is located followed by the file name.

Many file systems include logical and physical components. The logical file system is the level of the file system at which users can request file operations by system calls that carry out file system requests. The logical file system provides local name resolution for system calls. Local name resolution allows the logical file system to access multiple file system implementations, such as multiple physical file systems, through a uniform name space. The physical file system component manages permanent storage of data on the storage device 8. A file request would first be handled by the logical file system, which would then build a request to access the data to pass to the physical file system. The physical file system then proceeds to access the requested data directly from the storage device 8 using the address information of physical data on the storage device 8 to directly address the data on the storage device 8.

In preferred embodiments, the operating system 4 uses a hash function 10 to map the logical file names, e.g., c:\work\patents\file.dat, in the file system 6 to an integer hash value in a manner known in the art. In preferred embodiments, the hash function 10 is designed as a wide hash to produce a large number of possible hash values, e.g., 32,000 to 64,000 different hash values. Such a design would reduce the likelihood that two different file names would have the same hash value. The operating system 4 at some point would scan each file name in the file system 6, subject each file name to the hash function 10, and produce a hash value for each file name.

The operating system 4 further maintains a hash table 12 in cache memory. This hash table 12 may comprise a one dimensional table that includes a one bit entry for each possible hash value, wherein the descending entries correspond to ever increasing hash values. When scanning the file system 6 during initialization, the operating system 6 would apply the hash function 10 to each file name and then set the bit in the hash table 12 to "on" at the entry or row number corresponding to the integer hash value determined from the hash function 10. For instance, if a file name was hashed to "4", then the operating system 4 would turn the fourth entry in the hash table 12 to "on," indicating that there is a file name having a hash value of 4 in the storage device 8.

Figure 2:
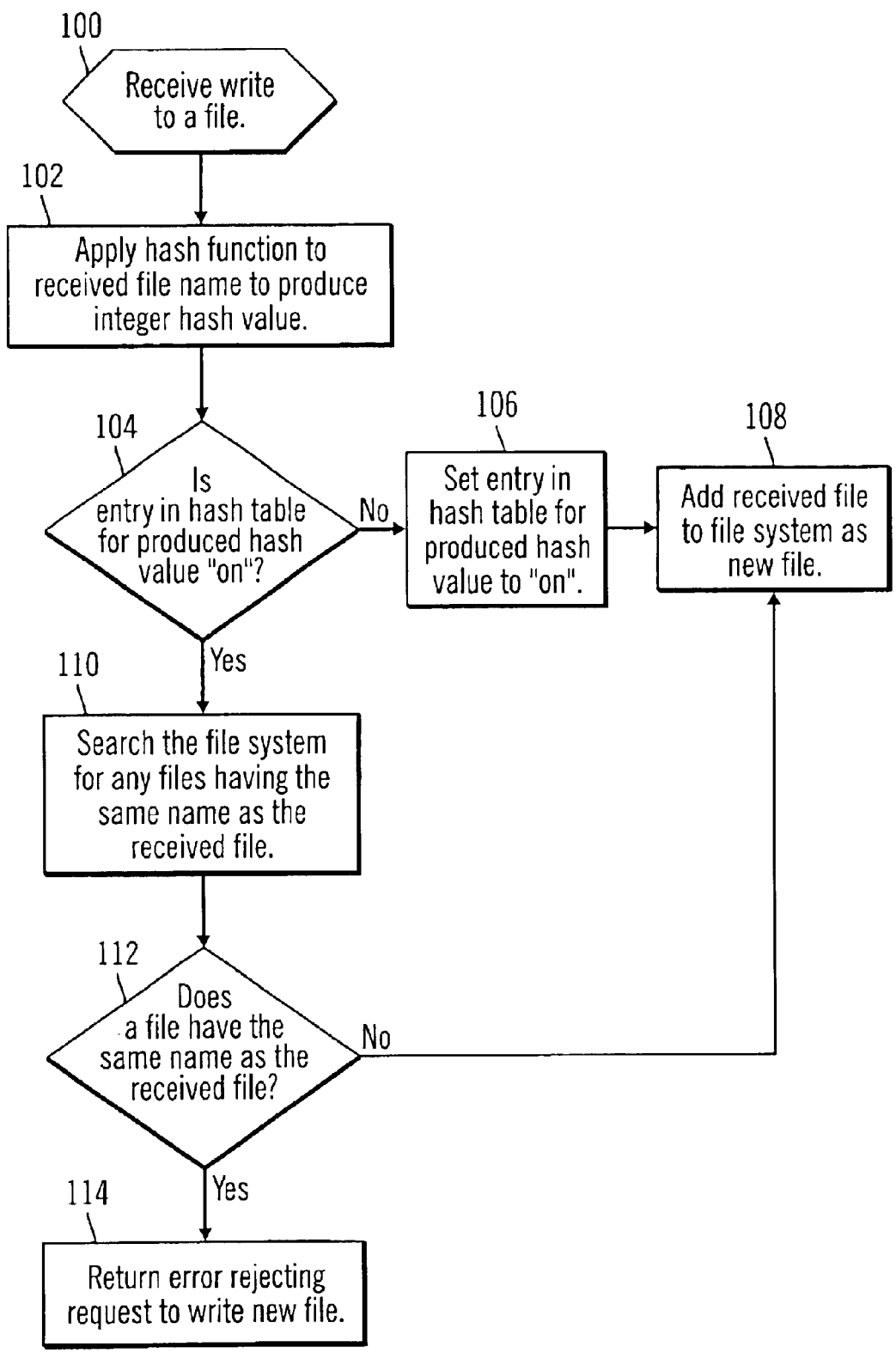
FIG. 2 illustrates logic to process a write request in accordance with preferred embodiments of the present invention.

FIG. 2 illustrates logic implemented in the operating system 4 to process requests to write data to a file in accordance with the preferred embodiments. Control begins at block 100 with the operating system 4 receiving a request to write a subject file. The operating system 4 applies (at block 102) the hash function 10 to the file name of the received file. If the entry in the hash table 12 corresponding to the determined hash value is "on" (at block 104), then this indicates that there is another file in the file system 6 that maps to the same hash value as the received file. As discussed, in wide hashes, it is unlikely that two files having different names will map to the same value. Thus, in most cases, indication that there is a preexisting file in the file system 6 mapping to the same hash value likely indicates that this preexisting file has the same name as the received file.

If there is not a file with the same name, i.e., the entry value is "off," then the operating system 4 sets (at block 106) the entry in the hash table 12 corresponding to the produced hash value to "on" and adds (at block 108) the received file to the file system as a new file.

If the entry in the hash table 12 for the produced hash value was "on," then the operating system 4 searches (at block 110) the file system 6 for any files having the same name as the received file. If, at block 112, it is determined that there is not a file in the file system 6 having the same name, then the operating system 4 adds (at block 108) the received file to the file system as a new file. Otherwise, if there is a file with the same name as the received file, then the operating system 4 returns an error rejecting the new file (at block 114) as the file already exists in the system. Blocks 112 and 114 occur if the write request is to write a new file to the system. In such case, if a file already exists with the same name, then the request is rejected at block 114. However, if the request is to update an existing file, as opposed to writing a new file, then the operating system 4 would overwrite a preexisting file with the same name or return an error rejecting the update request if there was no preexisting file with the same name in the file system 6 to update.

In further embodiments, the hash table 12 may comprise multiple columns, including entries for different directories in the file system 6. In this way, the hash table 12 can be used to obtain file information for multiple directories. Alternatively, whenever a new directory/folder is referenced, the hash function 10 is applied and the table is updated with the entries for the current directory of interest.

Preferred embodiments substantially reduce the time needed to write a file, especially in archival storage systems where most write operations are for new files, and not for preexisting files. Further, with preferred embodiments, time savings are even more apparent for very large file systems that are very fragmented, and would require even more time to search the file system. Moreover, the implementation of the preferred embodiment hash function 10 and table 12 utilizes minimal processor and cache resources, as opposed to current systems that use substantial processor resources to scan an entire fragmented file system or systems that require substantial tables to store a list of every file in the file system.

CONCLUSIONS AND ALTERNATIVE EMBODIMENTS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications that may be made to this configuration without departing from the scope of the present invention.

Preferred embodiments were described with respect to accessing the hash table when receiving a write request. However, the hash table could be accessed when receiving a read request to determine whether the requested file to read is in the file system.

In further embodiments, the preferred embodiment hash table could be used whenever a program or system needs to determine the presence of a file in the file system or operate on the file.

Preferred embodiments were implemented using a hash function to convert a file name comprised of a character string to an integer value. In alternative embodiments, functions other than hash functions may be used to convert a lengthy character string to a single integer values. Alternatively, the function may convert the file name to a value other than an integer value.

The hash table was defined as a single column array, wherein the location of the entry in the array indicates the corresponding hash value of the entry. In alternative embodiments, the table may comprise multiple columns, one indicating the value to which the file name was converted and another indicating the presence of the file.

In summary, preferred embodiments disclose a system, method, and program for processing an input file in a file system, wherein the input file has an input file name. A function is applied to map the input file name to a value. A data structure is processed to determine whether there is a preexisting file in the file system having a name that maps, according to the function, to the same value to which the input file name maps. Two files that map to a same value according to the function are capable of having a same name.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for processing an input file in a file system, wherein the input file has an input file name, comprising:

storing in cache memory a data structure generated by applying a hash function to all file names in the file system to determine integer values corresponding to the file names, wherein the hash function maps the input file names to integer values, wherein the data structure indicates those values corresponding to the file names to indicate all file names used in the file system, and wherein the data structure includes an entry for each possible integer value capable of being generated from the has function;

applying the has function to map the input file name to one integer value; and scanning the data structure in cache memory without reading directory information from storage locations in a storage device to determine whether there is a preexisting file in the file system having a name that maps, according to the hash function, to the integer value to which the input file name maps, wherein two files that map to one integer value according to the hash function are capable of having a same name.

2. The method of claim 1, wherein the mapped-to values require fewer bits of storage than the file names.

3. The method of claim 1, wherein processing the data structure to determine whether there is a preexisting file comprises determining whether the entry for the integer value to which the input file name maps indicates a presence of one preexisting file mapping to the integer value to which the input file name maps.

4. The method of claim 3, wherein the data structure is a one-dimensional array and wherein each entry is capable of having one of two values, further comprising setting the entry to a first value if there is one preexisting file name in the file system that maps to the integer value for the entry, and wherein determining whether there is one preexisting file comprises determining whether the entry for the integer value to which the input file name maps has the first value.

5. The method of claim 1, further comprising:
applying the hash function to each file name in the file system to map each file name to one integer value; and
indicating in the data structure for each file name, that there is one preexisting file for the integer value to which the file name maps.

6. The method of claim 5, wherein the input file is the subject of an access request further comprising scanning each file in the file system to determine if there is at least one preexisting file having the input file name if there is one preexisting file in the file system having a name that maps, according to the hash function, to the integer value to which the input file name maps.

7. The method of claim 6, wherein the access request to the input file is to a dd the input file as a new file to the file system, further comprising:
adding the input file as a new file to the file system if no preexisting file in the file system has the input file name; and rejecting the access request if there is a pre existing file in the file system having the input file name.

8. The method of claim 6, wherein the access request to the input file is to update a file in the file system with data from the input file further comprising:
updating a preexisting, file in the file system having the input file name with the data in the input file if the ere is such a preexisting file; and
rejecting the access request if there is no preexisting file in the file system having the input file name.

9. The method of claim 1, further comprising:
searching the file system for one preexisting file having the input file name if the data structure indicates that one preexisting file has a name that maps, according to the hash function, to the integer value to which the input file maps; and
performing an operation if the file system includes one preexisting file having the input file name.

10. The method of claim 9, wherein performing the operation comprises:
applying update data to the preexisting file having the input file name if the file system includes one preexisting file having the input file name.

11. The method of claim 9, wherein the input file comprises a file to add to the file system, further comprising:
returning an error if the file system includes one preexisting file having the input file name; and
adding the input file to the file system if the file system does not include one preexisting file having the same name as the input file.

12. The system method of claim 1, further comprising:
means for searching the file system for one preexisting file having the input file name if the data structure indicates that one preexisting file has a name that maps, according to the hash function, to the integer value to which the input file name map; and
means for performing an operation if the file system includes one preexisting file having the input file name.

13. The system of claim 12, wherein the means for performing the operation further performs:
applying update data to the preexisting file having the input file name if the file system includes one preexisting file having the input file name.

14. The system of claim 12, wherein the input file comprises a file to add to the file system, further comprising:
means for returning an error if the file system includes one preexisting file having the input file name; and
means for adding the input file to the file system if the file system does not include one preexisting file having the input file name.

15. The method of claim 1, wherein the hash function comprises a wide hash function to produce a large number of possible hash values to minimize the likelihood that the application of the hash function to file names in the file system would have a same hash value.

16. A computer system for processing an input file in a file system, wherein the input file has an input file name, comprising:
means for storing in cache memory a data structure generated by applying a hash function to all file names in the file system to determine integer values corresponding to the file names, wherein the hash function maps the input file names to integer values, wherein the data structure indicates those values corresponding to the file names to indicate all file names used in the file system, and wherein the data structure includes an entry for each possible integer value capable of being generated from the hash function;
means for applying the function to map the input file name to one integer value; and
means for scanning the data structure in cache memory without reading directory information from storage locations in a storage device to determine whether there is a preexisting file in the file system having a name that maps, according to the hash function, to the integer value to which the input file name maps, wherein two files that map to one integer value according to the hash function are capable of having a same name.

17. The system of claim 16, wherein the mapped-to values require fewer bits of storage than the file names.

18. The system of claim 16, wherein the means for processing the data structure to determine whether there is a preexisting file comprises determining whether the entry for the integer value to which the input file name maps indicates a presence of one preexisting file mapping to the integer value to which the input file name maps.

19. The system of claim 18, wherein the data structure is a one-dimensional array and wherein each entry is capable of having one of two values, further comprising setting the entry to a first value if there is one preexisting file name in the file system that maps to the integer value for the entry, and wherein determining whether there is one preexisting file comprises determining whether the entry for the integer value to which the input file name maps has the first value.

20. The system of claim 16, further comprising:
- means for applying the hash function to each file name in the file system to map each file name to one integer value; and
- means for indicating in the data structure, for each file name, that there is one preexisting file for the integer value to which the file name maps.

21. The system of claim 16, wherein the input file is the subject of an access request, further comprising means for scanning each file in the file system to determine if there is at least one preexisting file having the input file name if there is one preexisting file in the file system having a name that maps, according to the hash function, to the integer value to which the input file name maps.

22. The system of claim 21, wherein the access request to the input file is to add the input file as a new file to the file system, further comprising:
- means for adding the input file as a new file to the file system if no preexisting file in the file system has the input file name; and
- means for rejecting the access request if there is a preexisting file in the file system having the input file name.

23. The system of claim 21, wherein the access request to the input file is to update a file in the file system with data from the input file, further comprising:
- means for updating a preexisting file in the file system having the input file name with the data in the input file if there is such a preexisting file; and
- means for rejecting the access request if there is no preexisting file in the file system having the input file name.

24. The system of claim 16, wherein the hash function comprises a wide hash function to produce a large number of possible hash values to minimize the likelihood that the application of the hash function to file names in the file system would have a same hash value.

25. An article of manufacture for processing an input file in a file system, wherein the input file has an input file name, the article of manufacture comprising computer usable media including at least one computer program embedded therein that causes the computer to perform:
- storing in cache memory a data structure generated by applying a hash function to all file names in the file system to determine integer values corresponding to the file names, wherein the hash function maps the input file names to integer values, wherein the data structure indicates those values corresponding to the file names to indicate all file names used in the file system, and wherein the data structure includes an entry for each possible integer value capable of being generated from the hash function;
- applying the hash function to map the input file name to one integer value; and
- scanning the data structure in cache memory without reading directory information from storage locations in a storage device to determine whether there is a preexisting file in the file system having a name that maps, according to the hash function, to the integer value to which the input file name maps, wherein two files that map to one integer value according to the hash function are capable of having a same name.

26. The article of manufacture of claim 25, wherein the mapped-to values require fewer bits of storage than the file names.

27. The article of manufacture of claim 25, wherein processing the data structure to determine whether there is a preexisting file comprises determining whether the entry for the integer value to which the input file name maps indicates a presence of one preexisting file mapping to the integer value to which the input file name maps.

28. The article of manufacture of claim 27, wherein the data structure is a one-dimensional array and wherein each entry is capable of having one of two values, further comprising setting the entry to a first value if there is one preexisting file name in the file system that maps to the integer value for the entry, and wherein determining whether there is one preexisting file comprises determining whether the entry for the integer value to which the input file name maps has the first value.

29. The article of manufacturing of claim 25, further comprising:
- applying the hash function to each file name in the file system to map each file name to one integer value; and
- indicating in the data structure, for each file name, that there is one preexisting file for the integer value to which the file name maps.

30. The article of manufacture of claim 29, wherein the input file is the subject of an access request, further comprising scanning each file in the file system to determine if there is at least one preexisting file having the input file name if there is one preexisting file in the file system having a name that maps, according to the hash function, to the integer value to which the input file name maps.

31. The article of manufacture of claim 30, wherein the access request to the input file is to add the input file as a new file to the file system, further comprising:
- adding the input file as a new file to the file system if no preexisting file in the file system has the input file name; and
- rejecting the access request if there is a preexisting file in the file system having the input file name.

32. The article of manufacture of claim 30, wherein the access request to the input file is to update a file in the file system with data from the input file, further comprising:
- updating a preexisting file in the file system having the input file name with the data in the input file if there is such a preexisting file; and
- rejecting the access request if there is no preexisting file in the file system having the the input file name.

33. The article of manufacture of claim 25, further comprising:
- searching the file system for one preexisting file having the input file name if the data structure indicates that one preexisting file has a name that maps, according to the hash function, to the integer value to which the input file maps; and
- performing an operation if the file system includes one preexisting file having the input file name.

34. The article of manufacture of claim 33, wherein performing the operation comprises:
- applying update data to the preexisting file having the input file name if the file system includes one preexisting file having the input file name.

35. The article of manufacture of claim 33, wherein the input file comprises a file to add to the file system, further comprising:
- returning an error if the file system includes one preexisting file having the input file name; and
- adding the input file to the file system if the file system does not include one preexisting file having the input file name.

36. The article of manufacture of claim 25, wherein the hash function comprises a wide hash function to produce a large number of possible hash values to minimize the likelihood that the application of the hash function to file names in the file system would have a same hash value.

37. A computer implemented method for processing an input in a file system, wherein the input file has an input file name, comprising:

providing a data structure generated by applying a hash function to all file names in the file system to determine integer values corresponding to the file names, wherein the hash function maps the input file names to integer values, wherein the data structure indicates those integer values corresponding to the file names to indicate all file names used in the file system, and wherein the data structure includes multiple columns for different directories in the file system to indicate file names in different directories of the file system;

applying the hash function to map the input file name to one integer value; and processing the data structure to determine whether there is a preexisting file in the file system having a name that maps, according to the hash function, to the integer value to which the input file name maps, wherein two files that map to one integer value according to the hash function are capable of having a same name.

38. A computer system for processing an input file in a file system, wherein the input file has an input file name, comprising:

means for providing a data structure generated by applying a hash function to all file names in the file system to determine integer values corresponding to the file names, wherein the hash function maps the input file names to integer values, wherein the data structure indicates those integer values corresponding to the file names to indicate all file names used in the file system, and wherein the data structure includes multiple columns for different directories in the file system to indicate file names in different directories of the file system;

means for applying the hash function to map the input file name to one integer value; and means for processing the data structure to determine whether there is a preexisting file in the file system having a name that maps, according to the hash function, to the integer value to which the input file name maps, wherein two files that map to one integer value according to the function are capable of having a same name.

39. An article of manufacture for processing an input file in a file system, wherein the input file has an input file name, the article of manufacture comprising computer useable media including at least one computer program embedded therein that causes the computer to perform:

providing a data structure generated by applying a hash function to all file names in the file system to determine values corresponding to the file names, wherein the hash function maps the input file names to integer values, wherein the data structure indicates those integer values corresponding to the file names to indicate all file names used in the file system, and wherein the data structure includes multiple columns for different directories in the file system to indicate file names in different directories of the file system;

applying the hash function to map the input file name to one integer value; and processing the data structure to determine whether there is a preexisting file in the file system having a name that maps, according to the hash function, to the integer value to which the input file name maps, wherein two files that map to one integer value according to the hash function are capable of having a same name.

* * * * *

UNITED STATES PATENT AND TRADEMARK OFFICE
CERTIFICATE OF CORRECTION

PATENT NO.     : 6,915,302 B1
DATED          : July 5, 2005
INVENTOR(S)    : Armin Harold Christofferson et al.

It is certified that error appears in the above-identified patent and that said Letters Patent is hereby corrected as shown below:

<u>Column 6,</u>
Lines 60 and 61, "has" should be -- hash --.

Signed and Sealed this

Sixth Day of September, 2005

JON W. DUDAS
*Director of the United States Patent and Trademark Office*